(12) United States Patent
Kurahashi

(10) Patent No.: US 10,491,461 B2
(45) Date of Patent: Nov. 26, 2019

(54) INFORMATION PROCESSING APPARATUS AND METHOD

(71) Applicant: CANON KABUSHIKI KAISHA, Tokyo (JP)

(72) Inventor: Yuichi Kurahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 15/836,686

(22) Filed: Dec. 8, 2017

(65) Prior Publication Data

US 2018/0167259 A1  Jun. 14, 2018

(30) Foreign Application Priority Data

Dec. 13, 2016 (JP) .................. 2016-241708

(51) Int. Cl.
```
G06F 15/173   (2006.01)
H04L 12/24    (2006.01)
G06F 3/06     (2006.01)
G06F 13/00    (2006.01)
H04N 1/00     (2006.01)
G06F 3/12     (2006.01)
G06F 11/34    (2006.01)
```
(52) U.S. Cl.
CPC .......... *H04L 41/069* (2013.01); *G06F 3/0604* (2013.01); *G06F 3/067* (2013.01); *G06F 3/0659* (2013.01); *G06F 3/1203* (2013.01); *G06F 3/1273* (2013.01); *G06F 3/1285* (2013.01); *G06F 11/34* (2013.01); *G06F 13/00* (2013.01); *H04N 1/00* (2013.01)

(58) Field of Classification Search
CPC ............ H04N 1/00; G06F 11/34; G06F 13/00
See application file for complete search history.

(56) References Cited

U.S. PATENT DOCUMENTS

2009/0150455 A1*  6/2009  Kanda ..................... G06F 21/53
2011/0060864 A1*  3/2011  Yoshii ..................... G06F 3/061
                                                           711/103
2018/0239698 A1*  8/2018  Fukutomi ........... G06F 12/0246

FOREIGN PATENT DOCUMENTS

JP          2004072162 A        3/2004

* cited by examiner

*Primary Examiner* — Yves Dalencourt
(74) *Attorney, Agent, or Firm* — Canon U.S.A., Inc. IP Division

(57) ABSTRACT

An information processing apparatus transmits log information to a management server which manages a read pointer (RP) indicating position information corresponding to a latest log included in log information obtained from each network device. The information processing apparatus obtains a write pointer (WP) from a network device when starting to monitor a log of the network device. In a case where an existing RP is successfully obtained from the management server, the information processing apparatus issues an obtaining request to obtain log information to the network device by using the RP. In a case where an existing RP is not obtained successfully from the management server, the information processing apparatus transmits the WP as an RP to the management server, and issues an obtaining request to obtain log information to the network device by using the WP.

7 Claims, 6 Drawing Sheets

INFORMATION PROCESSING APPARATUS AND METHOD

BACKGROUND

Field

The present disclosure relates to a technique by which an information processing apparatus serving as a monitoring apparatus monitors log information generated and recorded by a network device and transmits the log information to a management server via a network.

Description of the Related Art

As cloud services and the Internet of Things (IoT) have become prevalent, a device management system has been developed, in which a management server receives and manages, via a network, operation information about network devices, such as an image processing apparatus equipped with a communication control unit. In such a system, a plurality of monitoring apparatuses for collecting the operation information about the network devices and the management server are connected with each other via a local area network (LAN), a wide area network (WAN), and/or the Internet. The network devices generate an enormous number of logs during execution of processing and store the logs as log information in a time-series manner. Examples of the logs include logs (histories) including contents and execution results of jobs such as a copy job, a print job, a scan job, and a facsimile transmission and reception job, and logs (histories) including information about internal errors occurring during processing. The log information is used to analyze the use statuses of the network devices and to investigate a cause of a problem that has occurred.

The monitoring apparatuses are installed in customer networks where the network devices from which the operation information including the log information is to be collected are installed. Log collection applications running on the monitoring apparatuses obtain the log information stored in the network devices, and transmit the log information to the management server on a regular basis or each time a specific amount of log information is accumulated. The management server is configured to store and manage the logs of the network devices received from the monitoring apparatuses so that the logs can be referred to from a remote location or can be tabulated and analyzed.

The network devices use a ring buffer as a means for storing and managing a plurality of logs of the same type in a time-series manner. The network devices internally manage information indicating a position at which a log is last written to the ring buffer as write position information (write pointer (WP)) with respect to each log type. The monitoring apparatuses specify write position information (WP) about logs of a network device, and thereby, the monitoring apparatuses can obtain log information from the network device within a specific range on the ring buffer where the logs are written. To prevent the monitoring apparatuses from obtaining the same logs repeatedly, information indicating the positions of the obtained logs on the ring buffer is managed as read position information (read pointer (RP)) about the logs of the network device.

For example, as a conventional technique, Japanese Patent Application Laid-Open NO. 2004-72162 discusses an image communication apparatus from which a plurality of job history management server apparatuses obtains job histories. The image communication apparatus manages read position information (RP) about logs with respect to each of the plurality of job history management server apparatuses.

Services for collecting and analyzing the log information about the network devices by the management server via the monitoring apparatuses are provided after consent of the customers owning the network devices. In such a case, even if the monitoring apparatuses can collect the log information about the network devices before the service provision period, the analysis of the information about the network devices not within the service provision period needs to be avoided. On the other hand, if all the logs generated during the service provision period are obtained without omission, the reliability the services can be secured.

If the services start to be provided to an existing network device at a specific time, no log is obtained by the monitoring apparatus during a period after the services start to be provided and before the network device generates a log. Read position information (RP) is therefore not recorded in the monitoring apparatus, the network device, or the management server. Suppose that the monitoring apparatus causes some trouble (initial problem) in such a situation, and the information processing apparatus itself serving as the monitoring apparatus is replaced or a program for implementing the monitoring function is re-installed. In such a case, the log read position after the start of the service provision may be unknown to the monitoring apparatus. The monitoring apparatus then obtains all the logs remaining in the network device since the omission of a log to be obtained needs to be avoided. As a result, the monitoring apparatus may obtain and transmit log information including logs before the start of the service provision to the management server.

SUMMARY

Various embodiments of the present disclosure are directed to providing a mechanism by which a management server can limit the logs that it handles to only those logs generated during a service provision period even in a case where a monitoring apparatus that provides logs to the management server is replaced after a service including obtaining log information from network devices by the monitoring apparatus starts to be provided.

According to one embodiment of the present disclosure, an information processing apparatus obtaining log information from a network device and transmitting the obtained log information to a management server which manages the network device includes a memory storing instructions for log monitoring, and a processor which is capable of executing the instructions. The instructions cause the information processing apparatus to issue a first obtaining request to obtain a write pointer to the network device when starting to monitor a log of the network device, the write pointer indicating position information corresponding to a latest log recorded in the network device; receive the write pointer based on the first obtaining request from the network device; issue a second obtaining request to obtain a first read pointer, to the management server, the first read pointer indicating position information corresponding to a latest log included in log information already obtained from the network device, the network device already managed by the management server; obtain the log information from the network device by using the position information corresponding to the first read pointer in a case where the first read pointer is obtained from the management server based on the second obtaining request; transmit the write pointer received from the network device to the management server in a case where the first read pointer is not obtained successfully from the management server based on the second obtaining request; and obtain the log information from the network device by using the position information corresponding to the write pointer received from the network device in a case where the first read pointer is not obtained successfully from the management server based on the second obtaining request, wherein the transmitted write pointer is managed as the first read pointer by the management server.

Further features will become apparent from the following description of exemplary embodiments with reference to the attached drawings.

DESCRIPTION OF THE EMBODIMENTS

A best mode for carrying out various embodiments of the present disclosure will be described below with reference to the drawings.

Figure 1:
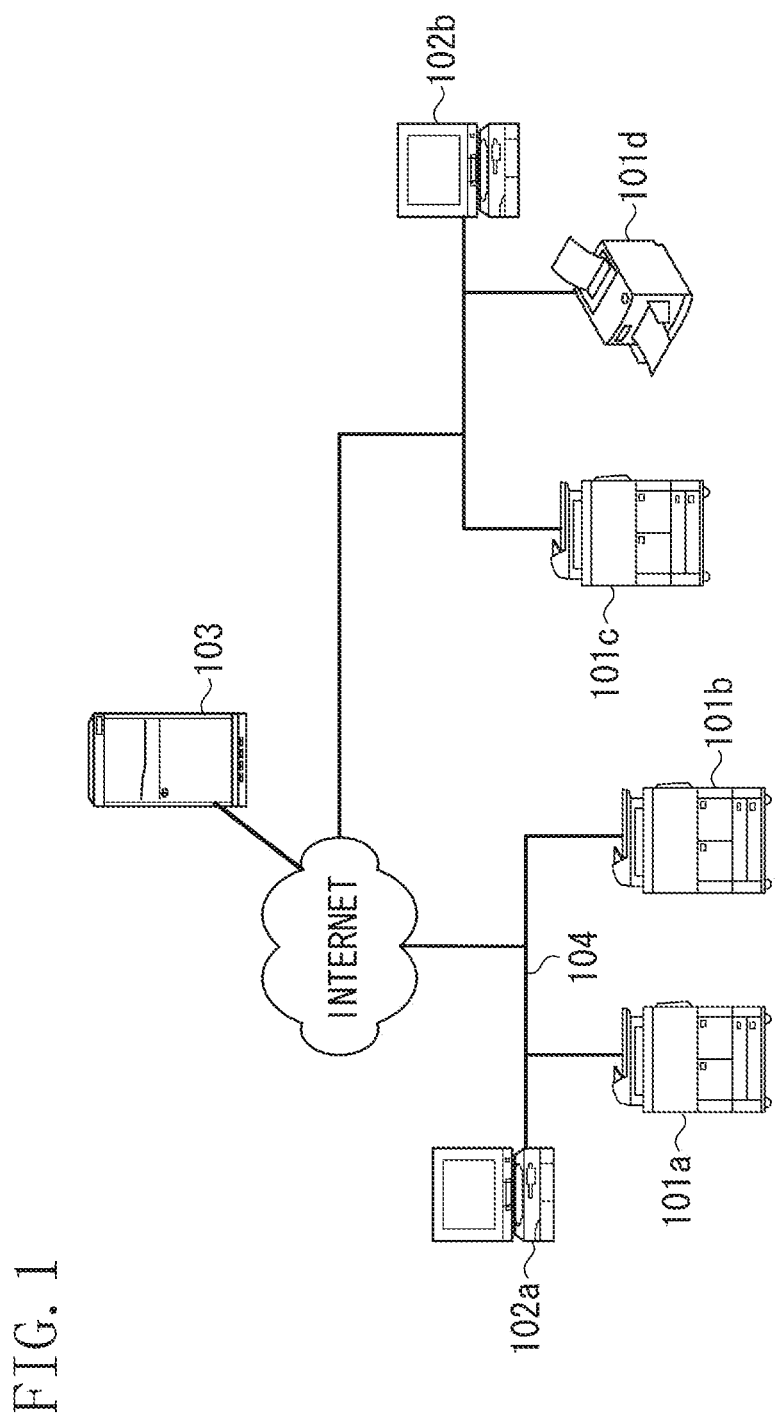
FIG. 1 is a diagram illustrating a system configuration an entire device management system.

FIG. 1 is a diagram illustrating a system configuration according to an exemplary embodiment of the present disclosure. A system according to the present exemplary embodiment includes network devices 101a to 101d, monitoring apparatuses 102a and 102b, a management server system 103 (hereinafter, referred to as a management server 103), a network 104, and the Internet. In the diagram, the network devices 101a and 101b are installed in (connected to) the same environment on the network 104 (such as LAN) as the monitoring apparatus 102a is. The environment represents a network environment of a customer who owns the network devices 101a and 101b. The network devices 101c and 101d, and the monitoring apparatus 102b have a similar relationship therebetween and have similar functions according to the present exemplary embodiment. A plurality f monitoring apparatuses can be installed in the same customer network environment so that distributed monitoring can be performed. In the following exemplary embodiment, processing performed between the network devices 101a and 101b and the monitoring apparatus 102a on the network 104 and the management server 103 will be described in detail.

The network devices 101 (101a and 101b) are devices to be monitored by the monitoring apparatus 102a. Examples of the network devices 101 include image processing apparatuses such as a printer, a copying machine, and a scanner. Each time the network devices 101 perform processing such as image processing (including copying, printing, scanning, and facsimile transmission and reception), and communication processing, or each time failure occurs to the network devices 101, the network devices 101 record a log including processing contents and results record by record.

The network devices 101 may be any devices that generate and record such a processing log. Examples may include a network camera, a digital medical instrument, an automobile, and a home appliance.

The monitoring apparatus 102a is implemented by executing a monitoring program by an information processing apparatus (for example, a general-purpose personal computer (PC)). The monitoring program has a function of monitoring the network devices 101. The monitoring apparatus 102a, as one of its functions, obtains log information including one or more logs generated and stored in the network devices 101. To monitor the network devices 101a and 101b, the monitoring apparatus 102a is installed in the same network environment as that to which the network devices 101a and 101b are connected.

In the present exemplary embodiment, replacing a monitoring apparatus itself with another apparatus or re-installing an upgrade version of the monitoring program for implementing the monitoring function will be referred to as replacement of the monitoring apparatus.

The management server 103 is a system on which a management program for managing information about the plurality of network devices 101a to 101d runs. The management server 103 includes one or more virtual machines (VMs). The management server 103 may be implemented by a physical server. The management server 103 is connected to the monitoring apparatuses 102a and 102b via a network such as the Internet, and provides services such as collection and analysis of the log information about the network devices 101.

Figure 2A:
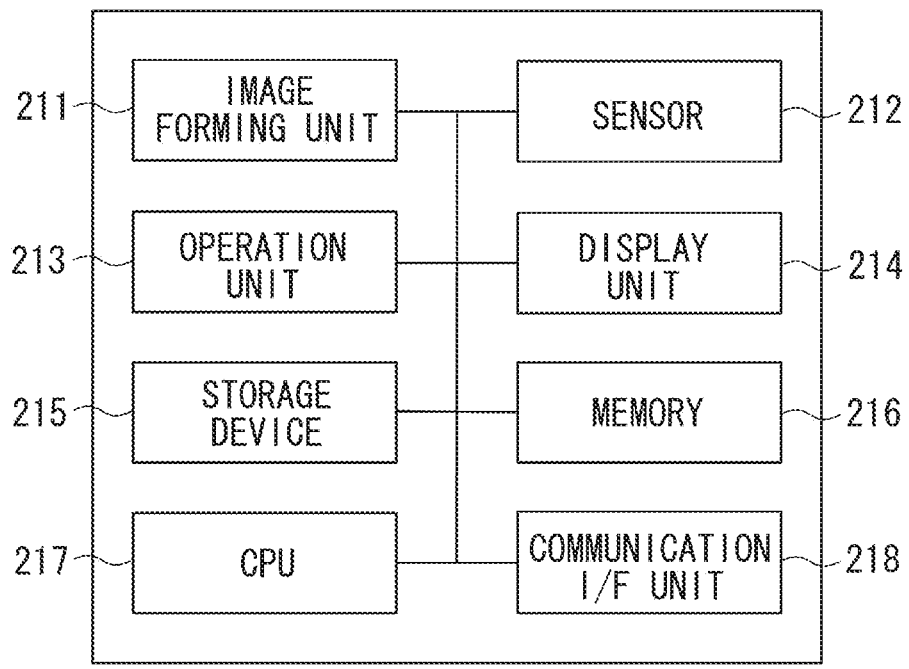
FIGS. 2A and 2B are diagrams illustrating hardware configuration examples of an image processing apparatus and an information processing apparatus.

FIG. 2A is a diagram illustrating a hardware configuration of an image processing apparatus according to the exemplary embodiment of the present disclosure. The image processing apparatus is an example of the network devices 101a and 101b. An image forming unit 211 includes a part or the whole of a printer, a scanner, or a facsimile. A sensor 212 is a device for detecting an operation of the image forming unit 211. The sensor 212 detects completion of image formation processing by the image forming unit 211, a processing error such as an operation abnormality, and/or running-out of consumables. An operation unit 213 includes an input device such as a hardware key and a touch panel, and accepts operations on the image forming unit 211 and operations for communication setting. A display unit 214 is an output device such as a display. The display unit 214 may be a touch panel integrated with the operation unit 213. The display unit 214 displays an operation state and device settings of the image processing apparatus. A storage device 215, such as a hard disk, stores an operating system (OS), an image processing program, and image data on which image formation processing is to be executed. A central processing unit (CPU) 217 loads the image processing program from the storage device 215 into a memory 216 and executes the image processing program. A communication interface (I/F) unit 218 is a network I/F that is connected to the monitoring apparatus 102a or 102b for monitoring logs and accepts an inquiry about log information.

Figure 2B:
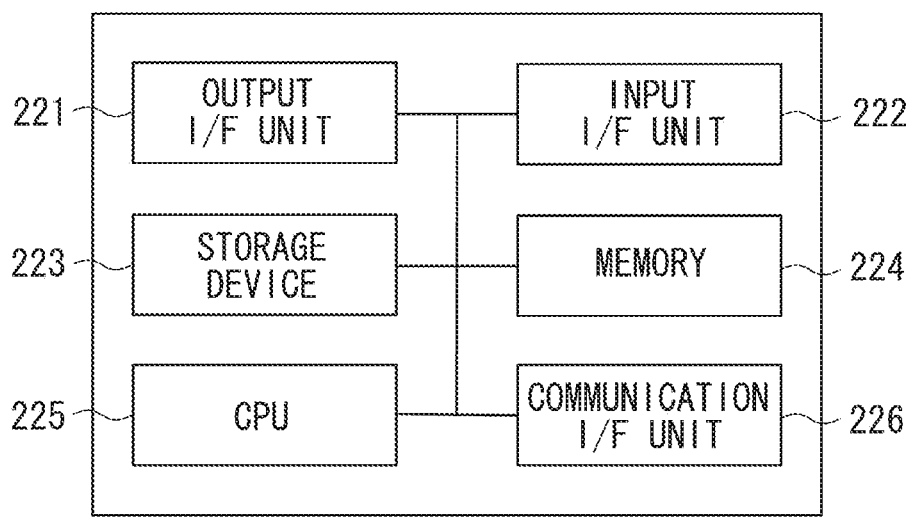

FIG. 2B is a diagram illustrating a hardware configuration of an information processing apparatus according to the exemplary embodiment of the present disclosure. Examples of the information processing apparatus include a PC for implementing the VM(s) of the management server 103 in a data center, and PCs serving as the monitoring apparatuses 102a and 102b. The information processing apparatus includes an output I/F unit 221, an input I/F unit 222, a storage device 223, a memory 224, a CPU 225, and a communication I/F unit 226. The output I/F 221 is connected to an output device, such as a display. The input I/F unit 222 is connected to an input device, such as a keyboard. The storage device 223 stores an OS, the monitoring program of the monitoring apparatuses 102a and 102b, and/or the management program of the management server 103. The CPU 225 loads the monitoring program or the management program from the storage device 223 into the memory 224 and executes the program. The communication I/F unit 226 is connected to the network 104, communicates with the network devices 101a and 101b of which logs are to be monitored, and controls communication between the monitoring apparatuses 102a and 102b and the management server 103. The information processing apparatus does not need to include components related to some of the input and output I/Fs, such as a display. The information processing apparatus may include a plurality of CPUs.

Figure 3A:
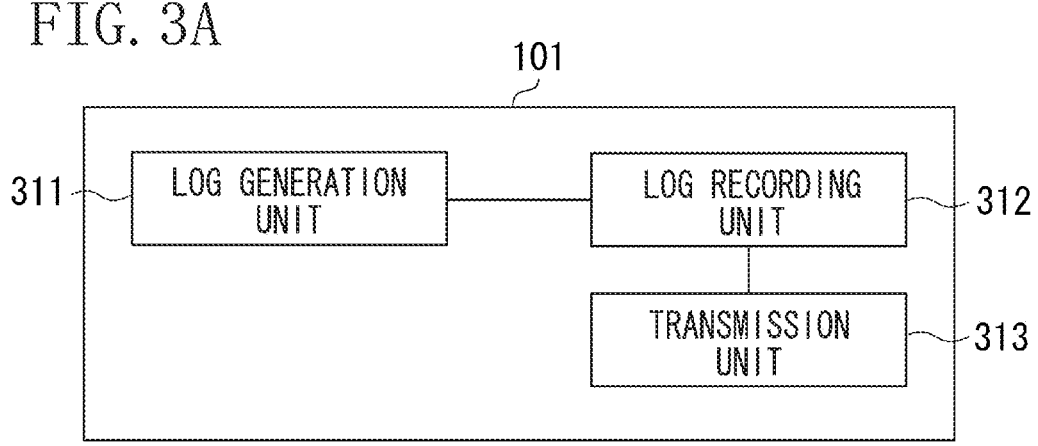
FIGS. 3A to 3C are diagrams illustrating software module configuration examples of a network device, a monitoring apparatus, and a management server.

FIG. 3A is a diagram illustrating functional blocks particularly related to the present exemplary embodiment in a module configuration of software running on a network device 101.

A log generation unit 311 generates logs including processing and detection contents and results according to completion/termination of the image formation processing by the image forming unit 211 and detection of processing errors such as an operation abnormality by the sensor 212. A log recording unit 312 records the logs into the storage device 215 in a time-series manner according to log types. The logs are recorded in the form of a ring buffer.

The logs to be recorded by the log recording unit 312 include a job log in which an execution result of a job, such as a print job, a copy job, and a scan job, is recorded, a communication log about facsimile communication, and an error log about a processing error. Table A illustrates an example of log information recorded and stored by the log recording unit 312.

TABLE A

| Log No. | Log recording date and time | Processing start date and time | Processing end date and time | Processing result | Number of pages |
|---|---|---|---|---|---|
| 1 | 2016/11/30 16:45:00 | 2016/11/30 16:44:55 | 2016/11/30 16:45:00 | Normal end | 1 |
| 2 | 2016/11/30 16:45:20 | 2016/11/30 16:45:00 | 2016/11/30 16:45:20 | Normal end | 8 |
| 3 | 2016/11/30 16:45:25 | 2016/11/30 16:45:20 | 2016/11/30 16:45:25 | Normal end | 2 |
| 4 | 2016/12/01 13:00:00 | 2016/12/01 12:59:00 | 2016/12/01 13:00:00 | Normal end | 20 |
| 5 | 2016/12/01 13:00:40 | 2016/12/01 13:00:00 | 2016/12/01 13:00:40 | Normal end | 10 |
| 6 | 2016/12/01 13:00:45 | 2016/12/01 13:00:40 | 2016/12/01 13:00:45 | Normal end | 2 |

In Table A, log number is identification (ID) information for uniquely identifying a log. In general, serial log numbers are assigned to logs of the same type in order of recording of the logs. A log recording date and time is information about a date and time when the log is recorded by the log recording unit 312. A processing start date and time is information about a date and time when the image forming unit 211 starts to process the job. A processing end date and time is information about a date and time when the image forming unit 211 ends the processing of the job. A processing result indicates a result of execution of the job. The number of pages is one of the pieces of information indicating the processing contents of the job. For example, in the case of a print job, the number of pages indicates the number of pages output by the image forming unit 211. In the case of a scan job, the number of pages indicates the number of pages read by the image forming unit 211. A job log may include other job information such as a job name and information about an owner of the job. The log recording unit 312 stores logs such as the logs illustrated in Table A according to the log types. A transmission unit 313 returns one or more logs stored by the log recording unit 312 and write position information (WP) corresponding to a latest (last) log number managed according to the log type in response to a request from the monitoring apparatus 102a. In the example of Table A, the write position information (WP) is information corresponding to log number "6" of the last recorded log.

Figure 3B:
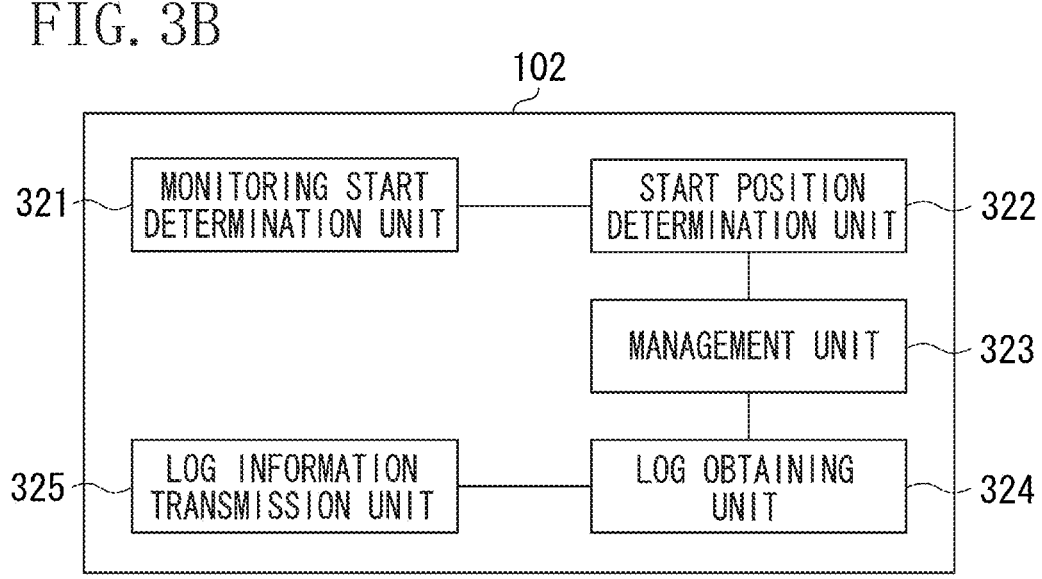

FIG. 3B is a diagram illustrating functional blocks particularly related to the present exemplary embodiment in a module configuration implemented by the monitoring program executed by the monitoring apparatus 102a.

A monitoring start determination unit 321 determines the start of the provision of services using log information by the management server 103 to the network devices 101 to be monitored. The monitoring apparatus 102a then issues a request for obtaining a log so that the management server 103 can handle log information after the start of the service provision. The monitoring start determination unit 321 connects to the transmission units 313 of the network devices 101 and determines whether to perform monitoring, including log obtaining processing. The monitoring start determination unit stores identification information and connection information (such as an Internet Protocol (IP) address) about the network devices 101 to be monitored by the monitoring apparatus 102a into the storage device 223.

A start position determination unit 322 determines, at the timing of obtaining logs, a first log to be obtained among a plurality of logs stored in the network devices 101 to be monitored. The start position determination unit 322 performs control during log monitoring so that logs generated by the network devices 101 before the start of the provision of the services using the log information by the management server 103 are to be excluded from the logs to be collected. Details will be described below.

A management unit 323 manages read position information (RP) with respect to each network device and with respect to each log type. The read position information (RP) is information for identifying the log having the last recorded log number among the one or more logs obtained from the network devices 101. The read position information (RP) is managed in the storage device 223. The management unit 323 further updates the read position information (RP) each time log information is successfully obtained from the network devices 101. Table B illustrates an example of a read position management table managed by the management unit 323.

TABLE B

| Device ID | Log type | Log read position |
|---|---|---|
| DEV00001 | print | 6 |
| DEV00001 | copy | 20 |
| DEV00001 | scan | 4 |

In Table B, a device ID is identification information for uniquely identifying a network device 101 to be monitored. A log type is information indicating a log type, based on which the log recording unit 312 of the network device 101 manages log numbers. A read position is read position information (RP) indicating a log number of a log, up to which logs have been obtained with respect to each log type of the network device indicated by the device ID.

A log obtaining unit 324 specifies a range of logs to be obtained based on the read position information (RP) managed by the management unit 323, and requests and obtains log information from the network devices 101. For example, the log obtaining unit 324 can issue an obtaining request for logs of a specific log type ranging from the read position information (RP) to the write position information (WP) managed by a network device 101. In such a case, the log obtaining unit 324 can obtain the logs by repeatedly issuing an obtaining request record by record up to the write position information (WP).

A log information transmission unit 325 performs processing for transmitting log information including one or more logs obtained by the log obtaining unit 324 to the management server 103.

Figure 3C:
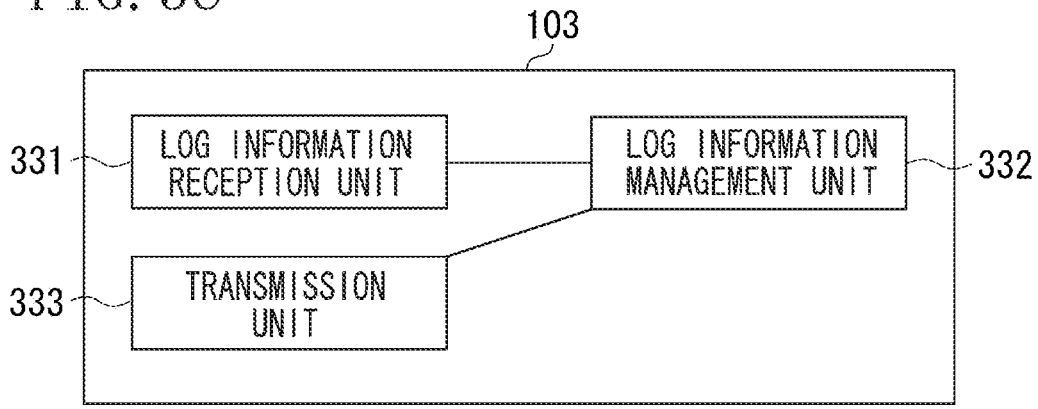

FIG. 3C is a diagram illustrating functional blocks particularly related to the present exemplary embodiment in a module configuration implemented by the management program running on the management server 103.

A log information reception unit 331 receives the log information transmitted from the monitoring apparatus 102a. A log information management unit 332 accumulates and stores the log information received by the log information reception unit 331 into a database (not illustrated). In the database, the log information management unit 332 further manages read position information (RP) as information indicating the log corresponding to the latest (last recorded) log number included in the log information received via the log information reception unit 331. On the management server 103, the read position information (RP) is managed with respect to each network device and with respect to each log type.

The read position information (RP) managed by the monitoring apparatus 102a and the read position information (RP) managed on the management server 103 do not necessarily coincide with each other because there is a time lag between a time at which the log is obtained by the monitoring apparatus 102a and a time at which the log information is received by the management server 103.

Table C illustrates an example of a read position management table of the management server 103, managed by the log information management unit 332. The contents stored in Table C are substantially the same as those of the read position management table of Table B.

A transmission unit 333 performs processing for returning specified read position information (RP) that the management server 103 manages by using the log information management unit 332, in response to an inquiry from the monitoring apparatus 102a.

TABLE C

| Device ID | Log type | Log read position |
|-----------|----------|-------------------|
| DEV00001 | print | 6 |
| DEV00001 | copy | 20 |
| DEV00001 | scan | 4 |
| DEV00002 | print | 40 |

TABLE C-continued

| Device ID | Log type | Log read position |
|-----------|----------|-------------------|
| DEV00002 | copy | 10 |
| DEV00002 | scan | 2 |

Figure 4:
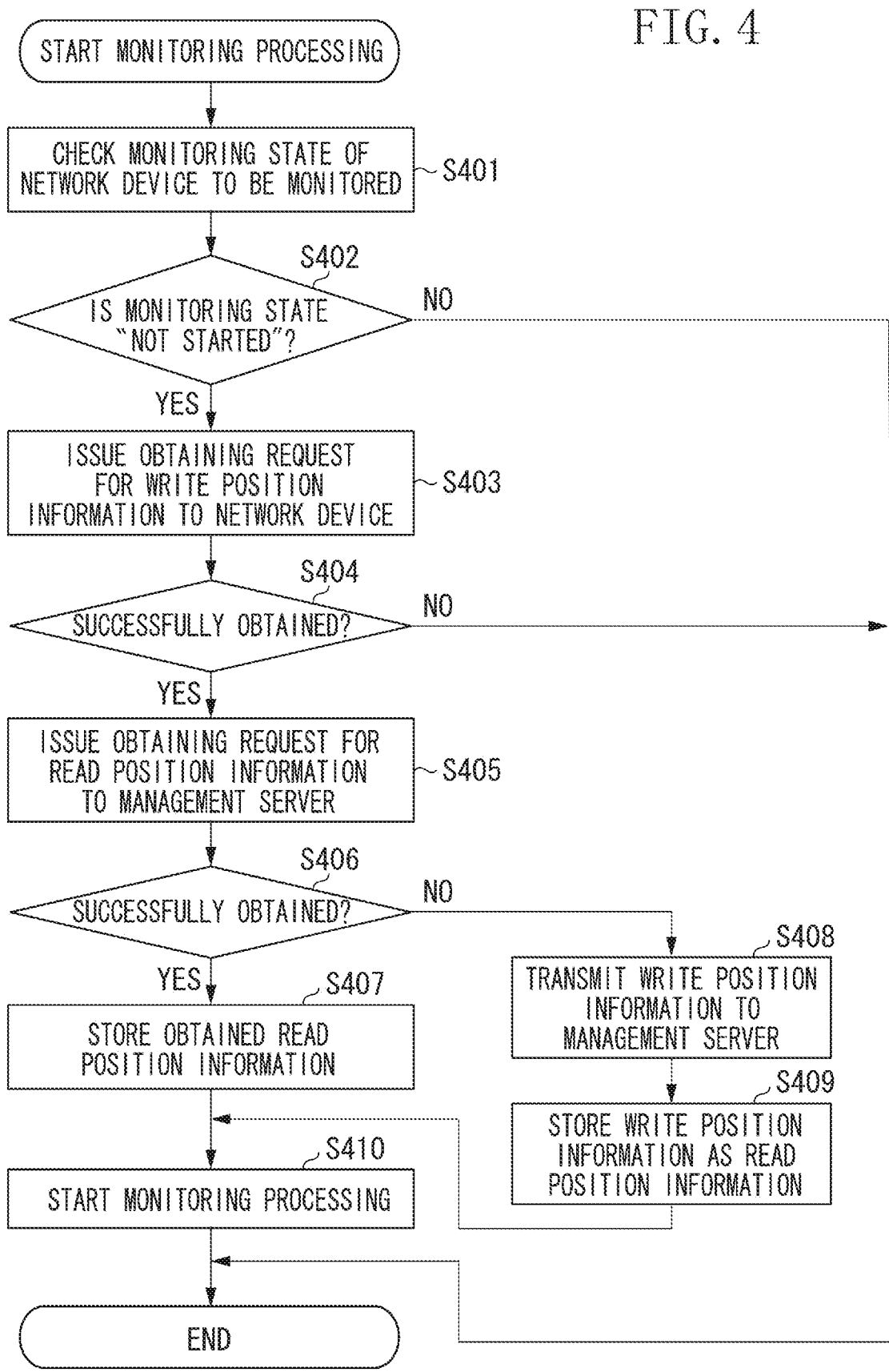
FIG. 4 is a flowchart for describing processing when the monitoring apparatus starts to monitor log information recorded in a network device.

FIG. 4 is a flowchart for describing processing for monitoring the logs of the network devices 101 by the monitoring apparatus 102a. The CPU 225 executes a program related to the functions as the monitoring apparatus 102a, whereby the present processing is implemented. The monitoring apparatus 102a starts the present processing in response to reception of an instruction to register or add a new network device to be monitored in accordance with the management server 103 starting to provide the services using log information. As an example, processing when the monitoring apparatus 102a starts to monitor logs of the network device 101a will be described.

In step S401, the monitoring start determination unit 321 refers to a device list of network devices 101 to be monitored by the monitoring apparatus 102a, and checks a monitoring state of the network device 101a. In step S402, the monitoring start determination unit 321 determines whether the monitoring state of the network device 101a is "not started". If the monitoring state is determined to be "not started" (YES in step S402), the processing proceeds to step S403. In the processing from step S403, it is to be determined whether the monitoring of log information about the network device 101a to be monitored can be started. If the monitoring state is not "not started", i.e., is "started" (NO in step S402), the present processing ends.

In step S403, the monitoring start determination unit 321 issues an obtaining request for obtaining write position information (WP) to the network device 101a by using the connection information, such as an IP address, about the network device 101a to be monitored in the device list. In the obtaining request, the identification information about the network device 101a and one or more log types are specified. All the log types can be specified. In step S404, the monitoring start determination unit 321 determines whether the write position information (WP) is successfully obtained from the network device 101a.

If the write position information (WP) is successfully obtained from the network device 101a (YES in step S404), the processing proceeds to step S405. Here, the monitoring start determination unit 321 also determines that the monitoring apparatus 102a can start the log monitoring of the network device 101a. The write position information (WP) is unable to be obtained in such cases as when the registered connection information about the network device 101a is wrong, when the network device 101a is not powered on, and when the network device 101a does not include the transmission unit 313. If the write position information (WP) is unable to be obtained (NO in step S404), the present processing ends without starting log monitoring. In such a case, the monitoring start determination unit 321 may notify the management server 103 of an error that the write position information (WP) is not obtained successfully from the network device 101a to be monitored.

In step S405, the start position determination unit 322 issues an obtaining request for obtaining the read position information (RP) about the network device 101a, managed by the management server 103, to the management server 103. In the obtaining request, the identification information about the network device 101a and one or more log types are specified. All the log types can be specified In step S406, the start position determination unit 322 determines whether the read position information (RP) about the network device 101a is successfully obtained from the management server 103. If the read position information (RP) is successfully obtained (YES in step S406), the processing proceeds to step S407. If the read position information (RP) is not obtained successfully (NO in step S406), the processing proceeds to step S408.

Replacement of a monitoring apparatus may occur when the monitoring apparatus to monitor the logs of the network device 101a is replaced with the monitoring apparatus 102a or when the monitoring program is set up again. In such cases, the management server 103 may have the read position information (RP) about the network device 101a if the monitoring apparatus to be replaced has transmitted the log information to the management server 103. The processing in step S405 is intended for the replacing monitoring apparatus 102a to inherit the read position information (RP).

On the other hand, if the system (device management system) including the management server 103 and the monitoring apparatus 102a monitors the network device 101a for the first time, the management server 103 has no read position information (RP) about the network device 101a. In such a case, the obtaining request in step S405 fails.

In step S407, the management unit 323 stores, the read position management table, the read position information (RP) successfully obtained based an the obtaining request in step S405 along with the identification information about the network device 101a and the log type(s). In such a manner, the start position(s) of obtaining a log or logs from the network device 101a is/are determined.

In step S408, the start position determination unit 322 transmits, to the management server 103, the write position information (WP) successfully obtained from the network device 101a based on the obtaining request in step S403 along with the identification information for identifying the network device 101a and information for identifying the log types) The management server 103 handles the write position information (WP) to be transmitted as the read position(s) of the network device 101a when the services using the log information start to be provided.

Suppose that no log information has been transmitted to the management server 103 through the processing in step S408 when the replacement of the monitoring apparatus 102a occurs. In such a case, the replacing monitoring apparatus performs the processing in step S405, so that the replacing monitoring apparatus can inherit write position information (WP) and determine the start position(s) of obtaining logs. In such a manner, the replacing monitoring apparatus can obtain the logs of the network device 101a recorded after the beginning of the service provision by the management server 103.

In step S409, the management unit 323 stores, into the read position management table, the write position information (WP) successfully obtained from the network device 101a based on the obtaining request in step S403 as read position information (RP), along with the identification information about the network device 101a and the log types. In such a manner, the start position(s) of obtaining logs from the network device 101a is/are determined.

In step S410, the monitoring apparatus 102a starts processing for monitoring the logs of the network device 101a. Specifically, the start position determination unit 322 determines a start position or positions of obtaining logs, and changes the monitoring state of the network device 101a to "started". The log obtaining unit 324 then issues an obtaining request for obtaining log information, specifying the read position information (RP) managed by the management unit 323.

Figure 5:
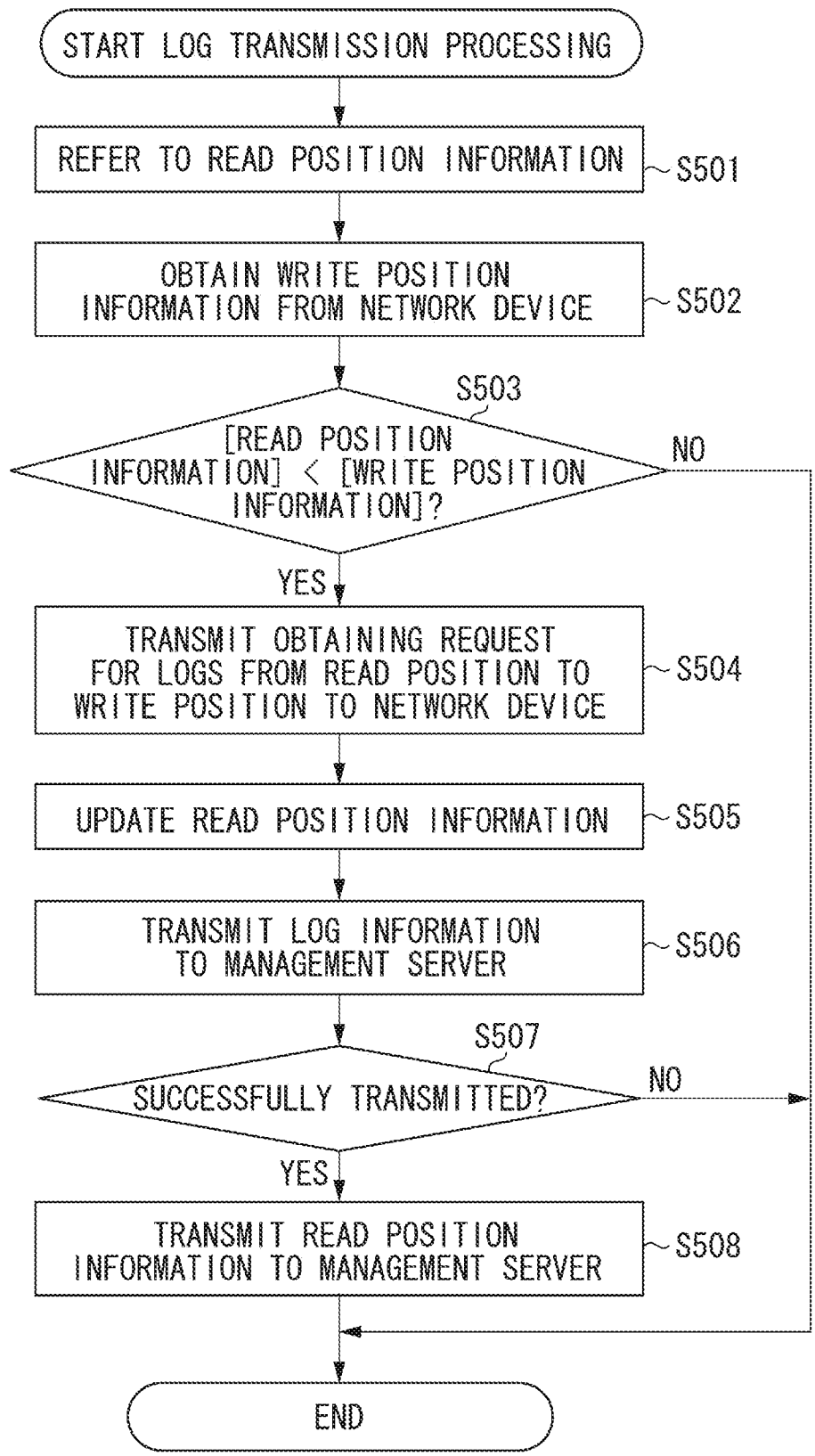
FIG. 5 is a flowchart for describing processing when the monitoring apparatus transmits the log information obtained from the network device to the management server.

FIG. 5 is a flowchart for describing processing in which the monitoring apparatus 102a, after step S410, obtains log information from the network device 101a and transmits the log information to the management server 103. Like FIG. 4, the CPU 225 executes the program related to the functions as the monitoring apparatus 102a, whereby the present processing is implemented. The monitoring apparatus 102a starts the present processing on a regular basis or at timing of receiving an instruction from the management server 103 after the foregoing step S410.

In step S501, the log obtaining unit 324 refers to and obtains the read position information (RP) about the network device 101a, managed by the management unit 323. In step S502, the log obtaining unit 324 issues an obtaining request for the write position information (WP) about the network device 101a and obtains the write position information (WP) from the network device 101a. In this processing, log types can be specified.

In step S503, the log obtaining unit 324 compares the read position information (RP) referred to in step S501 with the write position information (WP) obtained in step S502. If the write position information (WE) is greater than the read position information (RP) (YES in step S503), the processing proceeds to step S504 because a new log has been generated in the network device 101a. If the write position information (WP) is not greater than the read position information (RP) (NO in step S503), the present processing ends because no new log has been generated.

In step S504, the log obtaining unit 324 transmits, to the network device 101a, an obtaining request to obtain logs corresponding to a range from the read position information (RP) referred to in step S501 up to the write position information (WE) obtained in step S502. Log information including such logs can thereby be obtained from the network device 101a. The obtained log information is stored in the storage device 223.

In step S505, the management unit 323 updates the read position information (RP) the read position management table with position information indicating the log corresponding to the last log number in the obtained log information. Note that while the logs up to the write position information (WP) obtained in step S502 are requested in step S504, not all of the logs but only some of the logs up to a certain log number may be obtained. In step S505, the read position information (RP) is therefore updated not with the write position information (WP) but with the position information about the last log in the obtained log information.

In step S506, the log information transmission unit 325 transmits the log information including the untransmitted log(s) stored in the storage device 223 to the management server 103. In step S507, the log information transmission unit 325 determines whether the log information is successfully transmitted. If the log information is successfully transmitted (YES in step S507), the processing proceeds to step S508. If the log information is not transmitted successfully (NO in step S507), the present processing ends. The log information that is not transmitted successfully is to be transmitted at the next transmission timing (timing when the processing in FIG. 5 is performed again) along with new log information.

In step S508, upon having successfully transmitted the log information, the log information transmission unit 325 transmits, to the management server 103, the read position information (RP) updated in step S505 along with the identification information about the network device 101a and information for identifying the log type(s).

Figure 6:
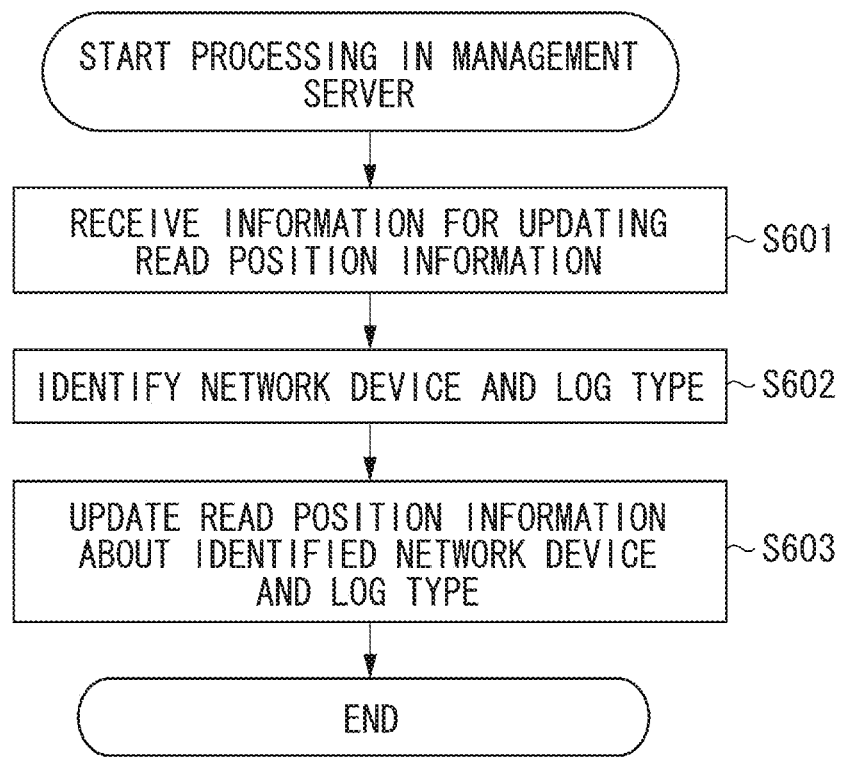
FIG. 6 is a flowchart for describing processing when the management server receives a notification including a read position of each device from the monitoring apparatus.

FIG. 6 is a flowchart for describing processing for updating the read position information (RP) about the logs managed by the management server 103. The CPU 225 executes a program related to the functions as the management server 103, whereby the present processing is implemented by a VM, for example.

In step S601, the log information management unit 332 receives information for updating the read position information from the monitoring apparatus 102a. The received information is information based on the processing of the foregoing step S408 or S508 performed by the monitoring apparatus 102a.

In step S602, the log information management unit 332 identifies the network device and the log type.

In step S603, the log information management unit 332 updates the read position information (RP) in the record corresponding to the identified network device and log type the read position management table with the position information received in step S601. If there is no such record, the log information management unit 332 creates a new record.

The log information management unit 332 may update the read position information (RP) not by the processing of step S508 and FIG. 6, but based an the contents of the logs included in the received log information when the log information reception unit 331 receives the log information based an the transmission processing of step S506.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that they are not limiting. The scope of the following claims is to be accorded the broadest interpretation so as to encompass all such modifications and equivalent structures and functions.

This application claims the benefit of Japanese Patent Application No. 2016-241708, filed Dec. 13, 2016, which is hereby incorporated by reference herein in its entirety.

What is claimed is:

1. An information processing apparatus obtaining log information from a network device and transmitting the obtained log information to a management server which manages the network device, the information processing apparatus comprising:
a memory storing instructions for log monitoring; and
a processor which is executing the instructions causing the information processing apparatus to:
issue a first obtaining request to obtain a write pointer to the network device when starting to monitor a log of the network device, the write pointer indicating position information corresponding to a latest log recorded in the network device;
receive the write pointer based on the first obtaining request from the network device;
issue a second obtaining request to obtain a first read pointer to the management server, the first read pointer indicating position information corresponding to a latest log included in log information already obtained from the network device, wherein the network device is already managed by the management server;
obtain the log information from the network device by using the position information corresponding, to the first read pointer in a case where the first read pointer is obtained from the management server based on the second obtaining request;
transmit the write pointer received from the network device to the management server in a case where the first read pointer is not obtained successfully from the management server based on the second obtaining request; and
obtain the log information from the network device by using the position information corresponding to the write pointer received from the network device in a case where the first read pointer is not obtained successfully from the management server based on the second obtaining request,
wherein the transmitted write pointer is managed as the first read pointer by the management server.

2. The information processing apparatus according to claim 1,
wherein the instructions further cause the information processing apparatus to manage a second read pointer indicating position information corresponding to a latest log included in the log information obtained from the network device, and
wherein the write pointer received from the network device is managed as the second read pointer in a case where the first read pointer is not obtained successfully from the management server based on the second obtaining request.

3. The information processing apparatus according to claim 2, wherein the second read pointer is updated in a case where the log information is successfully obtained from the network device.

4. The information processing apparatus according to claim 3, wherein the instructions further cause the information processing apparatus to transmit information to the management server for updating the first read pointer based on the obtained log information in a case where the log information obtained from the network device is successfully transmitted to the management server.

5. The information processing apparatus according to claim 1,
wherein the management server is further configured to manage the first read pointer with respect to each of a plurality of log types, and
wherein the instructions further cause the information processing apparatus to receive, as the write pointer based on the first obtaining request, a write pointer with respect to each log type from the network device and transmit the write pointer with respect to each log type to the management server.

6. A method for an information processing apparatus obtaining log information from a network device and transmitting the obtained log information to a management server which manages the network device, the method comprising:
issuing a first obtaining request to obtain a write pointer to the network device when starting to monitor a log of the network device, the write pointer indicating position information corresponding to a latest log recorded in the network device;
receiving the write pointer based on the first obtaining request from the network device;
issuing a second obtaining request to obtain a first read pointer to the management server, the first read pointer indicating position information corresponding to a latest log included in log information already obtained from the network device, wherein the network device is already managed by the management server;
obtaining the log information from the network device by using the position information corresponding to the first read pointer in a case where the first read pointer is obtained from the management server based on the second obtaining request;
transmitting the write pointer received from the network device to the management server in a case where the first read pointer is not obtained successfully from the management server based on the second obtaining request; and
obtaining the log information from the network device by using the position information corresponding to the write pointer received from the network device in a case where the first read pointer is not obtained successfully from the management server based on the second obtaining request
wherein the transmitted write pointer is managed as the first read pointer by the management server.

7. A non-transitory computer readable storage medium on which is stored a computer program for causing a computer to execute a method for an information processing apparatus obtaining log information from a network device and transmitting the obtained log information to a management server which manages the network device, the method comprising:
issuing a first obtaining request to obtain a write pointer to the network device when starting to monitor a log of the network device, the write pointer indicating position information corresponding to a latest log recorded in the network device;
receiving the write pointer based on the first obtaining request from the network device;
issuing a second obtaining request to obtain a first read pointer to the management server, the first read pointer indicating position information corresponding to a latest log included in log information already obtained from the network device, wherein the network device is already managed by the management server;
obtaining the log information from the network device by using the position information corresponding to the first read pointer in a case where the first read pointer is obtained from the management server based on the second obtaining request;
transmitting the write pointer received from the network device to the management server in a case where the first read pointer is not obtained successfully from the management server based on the second obtaining request; and
obtaining the log information from the network device by using the position information corresponding to the write pointer received from the network device in a case where the first read pointer is not obtained successfully from the management server based on the second obtaining request,
wherein the transmitted write pointer is managed as the first read pointer by the management server.

* * * * *